350-269 SR

8/28/84 XR 4,468,663

United States Patent [19]

Kalt

[11] Patent Number: 4,468,663

[45] Date of Patent: Aug. 28, 1984

[54] ELECTROMECHANICAL REFLECTIVE DISPLAY DEVICE

[76] Inventor: Charles G. Kalt, 29 Hawthorne Rd., Williamstown, Mass. 01267

[21] Appl. No.: 299,804

[22] Filed: Sep. 8, 1981

[51] Int. Cl.[3] .................................................. G02F 1/16

[52] U.S. Cl. .................................... 340/815.27; 340/783; 340/815.01; 340/815.04; 350/269

[58] Field of Search ...................... 340/815.04, 815.27, 340/815.01, 815.05, 783, 764, 763; 40/447; 350/266, 269, 360

[56] References Cited

U.S. PATENT DOCUMENTS

| | | | |
|---|---|---|---|
| 3,648,281 | 3/1972 | Dahms et al. | 340/815.27 |
| 3,897,997 | 8/1975 | Kalt | 350/269 |
| 4,094,590 | 6/1978 | Kalt | 350/269 |
| 4,160,582 | 7/1979 | Yasuo | 350/269 |
| 4,160,583 | 7/1979 | Ueda | 350/269 |
| 4,229,075 | 10/1980 | Ueda et al. | 350/269 |
| 4,336,536 | 6/1982 | Kalt et al. | 340/783 |

*Primary Examiner*—Glen R. Swann, III
*Attorney, Agent, or Firm*—Anthony H. Handal

[57] ABSTRACT

An electrostatically driven electromechanical display device is disclosed. It comprises first electrode means having a reflective face of first reflectivity and second electrode means having a reflective face of second reflectivity, that second reflectivity being different from the first reflectivity. A flexible conductive tongue is disposed between the first and second electrode means. First support means supports the first electrode means with its face in facing spaced relationship to the face of the second electrode means. Second support means supports the tongue between the facing portions of the first and second electrode means in a position where the tongue may be caused to bear against the face of the first electrode means and where the tongue is in contact with the first electrode means and the second electrode means.

12 Claims, 5 Drawing Figures

ELECTROMECHANICAL REFLECTIVE DISPLAY DEVICE

TECHNICAL FIELD

The invention relates to a reflective electromechanical display device having two display states.

BACKGROUND ART

Modern display systems typically employ bistable or analog electronic devices. These include cathode ray tube displays, light emitting diode displays and liquid crystal displays. Two of these systems, namely, cathode ray tubes and light emitting diodes suffer from the problem of relatively high power consumption and poor visibility during high ambient light conditions (e.g. sunlight). While liquid crystals solve the problem of power consumption and loss of readability under high levels of illumination, nevertheless, their contrast is generally quite poor under all conditions, thus rendering them difficult and time consuming to interpret. Interpretation time is particularly important in many applications such as advertising where consumers' attention must be attracted and held within the duration of a glance or an instrumentation application where operation decisions must be made quickly.

In recent years, interest has been renewed in the use of electromechanical systems for display purposes. One of the earliest uses of the same was in the area of clocks where cards having half numerals painted on them are rotated on an axle to sequentially display numerals signifying the time. Bistable systems have also been proposed. In U.S. Pat. No. 3,648,281, Dahms suggests that a display panel can be made by constructing a device having a dark panel and a light panel and magnetically supporting a flag having a dark side and a light side between the panels and driving the device electrostatically to expose alternately the dark side of the flag and the dark panel or the light side of the flag and the light panel. However, while this idea was first proposed in the late 1960's, it has failed to see any practical implementation, largely because of the difficulties involved in manufacturing and maintaining such display structures. Still another problem with Dahms' device was the fact that the flag had to traverse a relatively wide angle (the wide angle is required in order to have a wide angle of view with the device), resulting in excessively long time periods for changing the state of the display and relatively high driving voltages.

One bistable system which has seen relatively wide employment is a panel that incorporates a matrix of hundreds of rotatable coin-shaped disks with black painted front faces and bright reverse sides mounted on a black background panel. Each of these disks are rotated or "flipped" by one of hundreds of electromagnets, one of which is connected to each of them to expose the bright color on their reverse. However, despite its employability in such areas as bus destination signs, this sort of system is very expensive to manufacture, requires expensive drive circuitry and can only be operated slowly.

U.S. Pat. No. 3,772,537 of Clifford et al. suggested that a metal coated plastic film coiled at one end of a device could be electrostatically unfurled to block a light source. While, this structure is essentially unsuited for use in a display, it is noted that, to the best knowledge of the applicant, such systems have not seen any commercial employment, probably due to the inappropriateness of this structure for large area multi-element displays.

In the early 1970's, I conceived a device shown in U.S. Pat. No. 3,897,997 comprising a pair of fixed electrodes and a flexible tongue disposed between them. Whereas this configuration would have been regarded as impractical because the electrodes which form the panels are not nearly in the plane of display of the device, I solved this problem by making the flexible tongue electrode reflective. Because the tongue is flexible and because of the configuration of the fixed electrodes, I was also able to replace the magnetic hinge of Dahms with a simple flexible mount.

In my later U.S. Pat. No. 4,094,590, I disclosed a tongue mounting structure which greatly reduces criticality of the manufacturing techniques used to manufacture my electrostatic display device through the use of a wrinkle reducing stressed tongue. In my co-pending U.S. patent application Ser. No. 103,995, entitled REFLECTIVE VIDEO DISPLAY AND METHOD OF MAKING SAME, now U.S. Pat. No. 4,336,536, I have refined the optics of the reflective electrostatic display device by the use of a pair of flat reflective configurations for the tongue, which configurations are at a relatively small angle with respect to each other, whereby an extremely wide field of view is obtained.

Generally, the devices covered by my earlier patents operate by mounting the tongue in such a manner that it is at rest positioned adjacent one electrode in one of the display states and driving it to the other display state by electrostatically attracting it to the other fixed electrode. While this arrangement has been found to work well, under certain conditions operation becomes erratic, apparently due to relatively permanent changes in the electrostatic characteristics of the device.

SUMMARY OF THE INVENTION

The invention, as claimed, is intended to provide a remedy. It solves the problem of providing an electrostatic display device whose operation is dependable and predictable under a wide variety of circumstances and after long periods of extended use. In addition, the inventive structure exhibits increased speed in the response time needed to change from one display state to the other.

The advantages offered by the invention subsist largely in the provision of a display device including a tongue which is astable in both display states. Permanent changes in the device's electrostatic characteristics are prevented by periodically altering the drive signal and, accordingly, the electrostatic forces which result therefrom.

BRIEF DESCRIPTION OF THE DRAWINGS

Several ways of carrying out the invention are described in detail below with reference to the drawings which illustrate only several specific embodiments, in which.

BEST MODE FOR CARRYING OUT THE INVENTION

Figure 1:
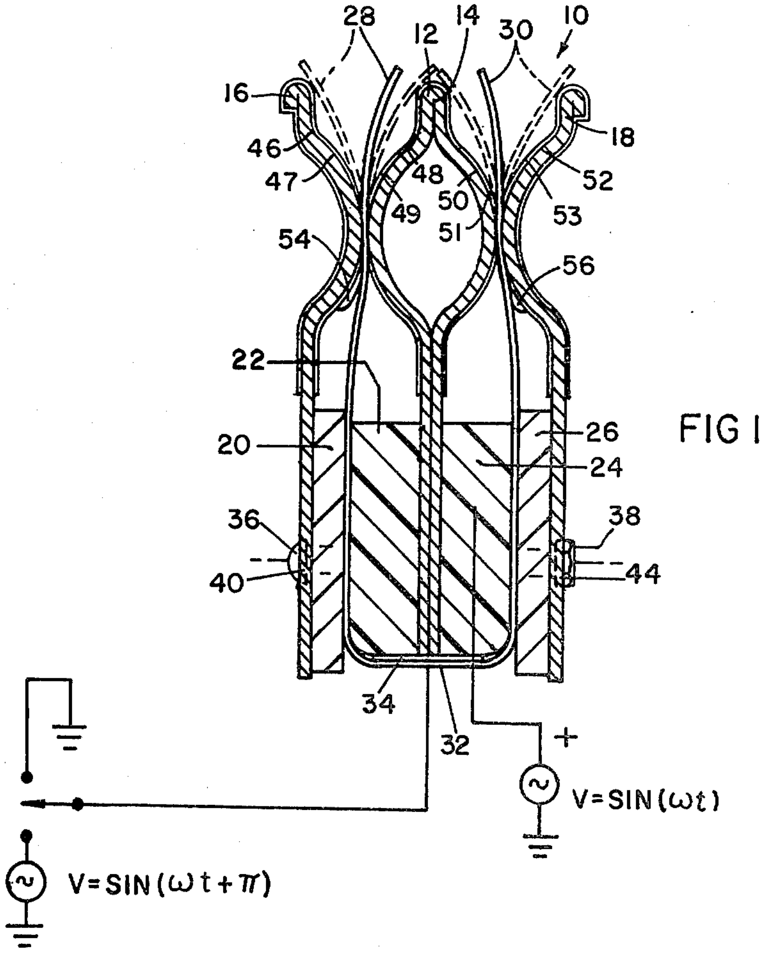
FIG. 1 is a diagramatic view of a display device constructed in accordance with the present invention illustrating the principle of the present invention.

As shown in FIG. 1, the inventive display element 10 comprises a pair of fixed electrodes 12 and 14 formed from a single sheet of brass. Active fixed electrode 12 faces a grounded fixed electrode 16 and active fixed electrode 14 faces a grounded fixed electrode 18. Grounded fixed electrode 16 is secured to a thin support block 20 which, in turn, is secured to a thick support block 22. Support block 22 is secured to active electrode 12, and active electrode 12 is integral with active electrode 14. Active electrode 14 is, in turn, secured to thick support block 24 which, in turn, is secured to thin support block 26. Finally, grounded fixed electrode 18 is secured to thin support block 26. A tongue 28 is positioned with its face between thin support block 20 and thick support block 22, and its top portion positioned between electrodes 16 and 12. Tongue 30 is, likewise, secured between thick support block 24 and thin support block 26, and positioned with its upper portion between active electrode 14 and grounded electrode 18. Tongues 28 and 30 are made from a single mylar strip 32 and thus are integral with one another. Mylar strip 32 thus comprises the upper portion of tongue 30 and continues between blocks 24 and 26 underneath blocks 24 and 22, between blocks 20 and 22 and finally proceeds between electrodes 16 and 12. An insulator 34 is positioned between the bottom of active fixed electrodes 12 and 14 and the central portion of mylar strip 32 to prevent electrical contact therebetween.

The fixed electrodes, support blocks and tongues are maintained in the positions illustrated in FIG. 1 by a nylon bolt 36 which passes through these elements to tightly engage a nylon nut 38 to maintain the structural integrity of the display 10. It is noted that the head 40 of bolt 36 rests in a detent in electrode 16 and block 20. Likewise, nut 38 rests in a detent 44 in electrode 18 and block 26. This allows adjacent display device 10 to be flush mounted against one another.

In accordance with the present invention, the display device 10 illustrated in FIG. 1 may be made from a wide variety of materials. Typically, however, the electrodes are made of a conductive material, such as sheet brass having a thickness on the order of 0.5 mm. Mylar strip 32 and thus tongues 28 and 30 are made of metalized mylar having a $25\times10^{-6}$ mm. thick layer of conductor on both sides and having a film thickness on the order of 0.005 mm. Thin support blocks 20 and 26 have a cross-sectional size on the order of 1 cm. by 0.15 cm. and the thick support blocks 22 and 24 have cross-sectional dimensions of about 1 cm. by 0.35 cm. Insulator 34 may also be made of mylar but with a thickness on the order of about 0.05 mm. and is glued to the underside of blocks 22 and 24.

Figure 2:
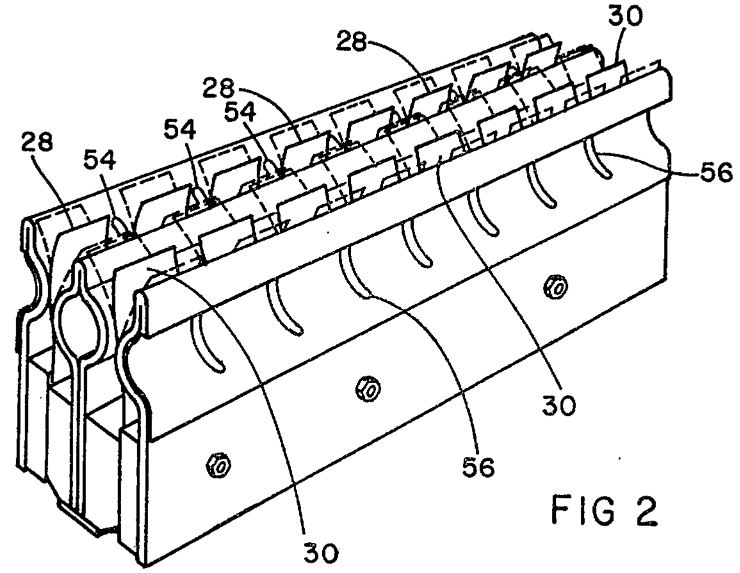
FIG. 2 is a perspective view of a multi-element display device constructed in accordance with the present invention.

Variable reflectivity of display element 10 is achieved by coating the reflective face 46 of electrode 16 with a light colored insulative paint layer 47 and the reflective face 48 of electrode 12 with a dark insulative paint layer 49. Likewise, the reflective face 50 of electrode 14 is colored with a dark insulative paint layer 51 and the reflective face 52 of electrode 18 is coated with a light reflective paint layer 53. As shown in FIGS. 1 and 2, grounded fixed electrodes 16 and 18 are provided at periodically spaced points, these points being located between adjacent tongues 28 and between tongues 30, with raised portions 54 and 56, respectively. The function of raised portions 54 and 56 is to maintain a separation between electrodes 16 and 12, and electrodes 14 and 18, respectively (See FIG. 1). This is achieved because the height of raised portions 54 is on the order of about 0.025 mm. which is about five times the thickness of tongues 28 and 30.

In the unactivated state, tongues 28 and 30 generally assume the positions illustrated in solid lines in FIG. 1. This position is achieved because of the offset mounting of the tongues between the thin and the thick electrodes which also causes them to be in contact with both electrodes between which they are mounted. For purposes of illustration, reference is made to tongue 28 which is mounted off-center between blocks 20 and 22 causing it to be deflected against fixed electrode 16. If active fixed electrode 12 were not positioned as illustrated, tongue 28 would assume the position shown dashed lines in FIG. 1. However, electrode 12 deflects it to the position shown in solid lines in FIG. 1.

Figure 3:
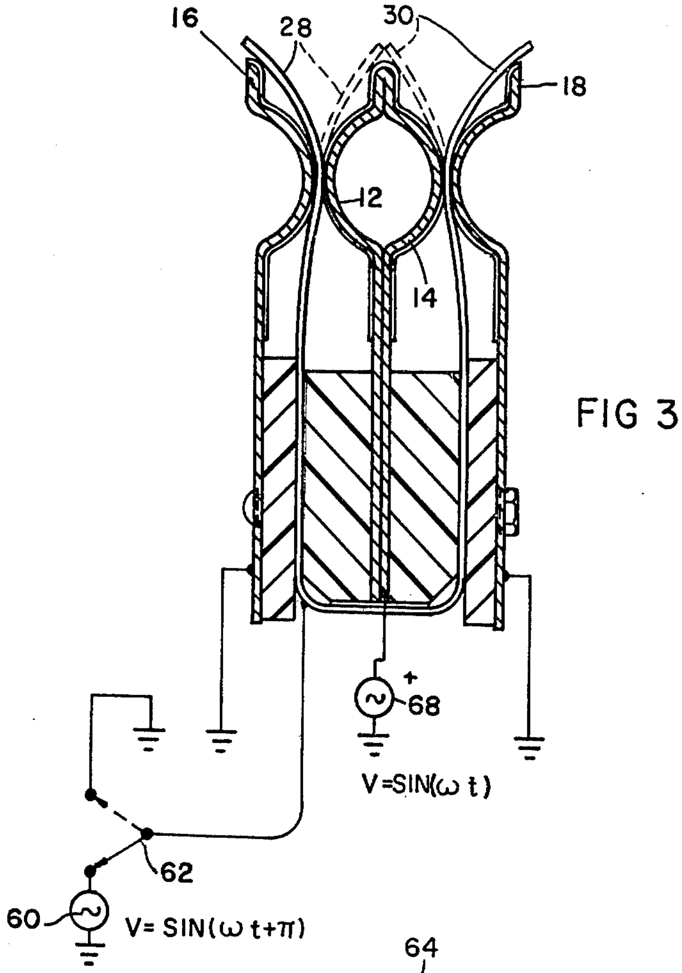
FIG. 3 is a schematic diagram showing the method of driving the display constructed in accordance with the present invention.

When it is desired to use the inventive display device 10 by deflecting the tongues 28 and 30 between the positions illustrated in solid lines and dashed lines in FIG. 3, grounded fixed electrodes 16 and 18 are connected to ground and active fixed electrodes 12 and 14 are connected to a square-wave source having a frequency on the order of about 60 Hz. Tongues 28 and 30 are then alternatively connected either to ground or to a square-wave source 60 which is 180° out of phase with source 68. Such alternate connection is made by a switch 62 which may be a transistor or any other suitable switching device. When switch 62 is in the position illustrated in solid lines in FIG. 3 and the tongues 28 and 30 are connected to source 60, the tongues then become attracted to grounded electrodes 16 and 18 as illustrated in solid lines in FIG. 3. In this position no attraction exists between the tongues and the active electrodes 12 and 14 because the signals with which they are driven are exactly 180° out of phase with each other. To say it another way, the signals are inverses of each other and only repulsive forces exist.

If it is desired to change the state of the display 10 to that illustrated in dashed lines in FIG. 3, switch 62 is moved to the position shown in dashed lines in FIG. 3 and tongues 28 and 30 are thus connected to ground. In this state, tongues 28 and 30 are attracted to active fixed electrodes 12 and 14, respectively, and thus assume the positions shown in dashed lines in FIG. 3. Inasmuch as the tongues and the grounded fixed electrodes 16 and 18 are all connected to ground no attractive forces exist between them. In connection with the operation of the device, it is noted that the insulative paint which provides the faces of the fixed electrodes with the desired light and dark color prevents electrical contact between the double-metalized surfaces of the tongues and the conductor portion of the fixed electrodes.

The above-described display device has a number of distinct advantages over the prior art. Problems due to permanent or relatively permanent alteration of the electrostatic properties of the tongues is, effectively non-existent. This is achieved through the use of alternating current driving voltages. The use of square-wave signals as opposed to sinusoidal signals results in substantially constant strong attractive forces. The same is assured by the fact that the peak values of the square-wave are substantially higher than ground and the minimum values of the square-wave are substantially lower in potential than ground and the fact that these peaks and minimums are quickly achieved through the use of a square-wave.

Likewise, because of the fact that different mechanisms are used in prior art devices to bring the device into the display states, namely, the spring force of the returning mylar and the attractive force in the opposite direction, unlike the prior art, the operation of the device of the present invention is uniform in both directions. Moreover, with active drives in both directions reliability of performance is greatly increased. Even more important, the average speed of the device (which is defined as the time it takes to go from light to dark to light again) in significantly faster.

Figure 5:
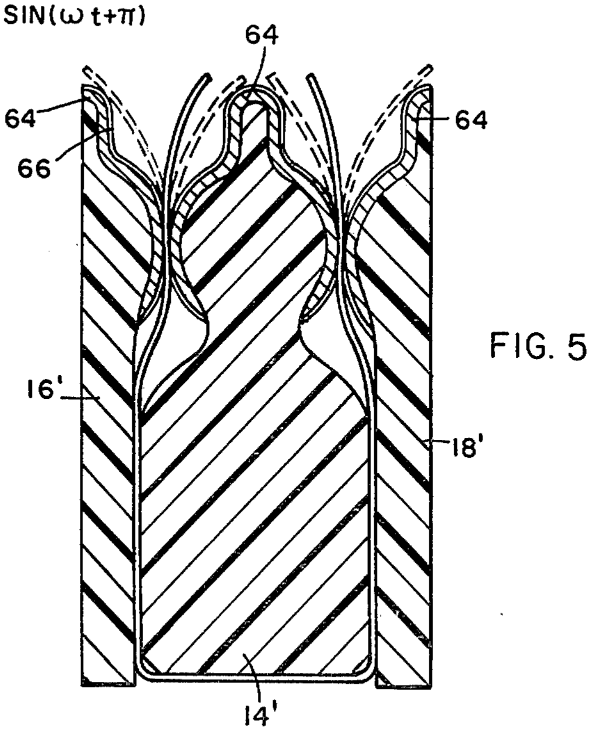
FIG. 5 is a diagramatic representation of an alternative embodiment of the invention.
Figure 4:
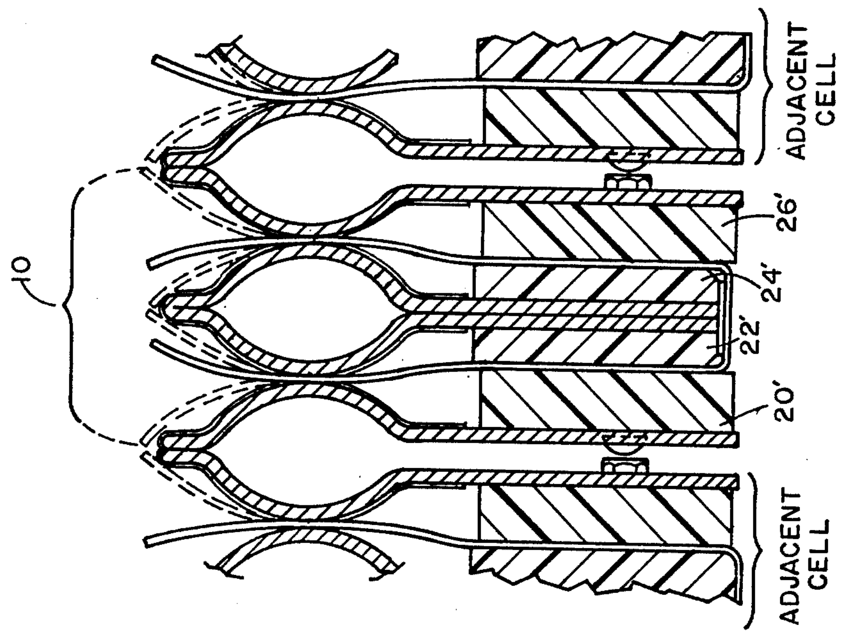
FIG. 4 is a diagramatic representation of an alternative display device constructed in accordance with the invention.

While a particular embodiment of the invention has been described, it is, of course, understood that modifications may be made without departing from the scope of the invention which is limited and defined only by the claims herein. For example, it is possible to vary the drive signals by, for example, making the active fixed electrodes function as the grounded fixed electrodes and vice versa. Likewise, the frequency of the drive signal may be varied. Additionally, instead of providing the detents 42 and 44 illustrated in FIG. 1, the head 40 and nut 38 may be allowed to protrude and extend into recesses provided in adjacent displays 10. Likwise, as is illustrated in FIG. 4, it is possible to reverse the positions of the thin and thick support blocks by providing the device with a pair of thick support blocks 20' and 26' and a pair of thin support blocks 22' and 24'. FIG. 4 also shows a plurality of the inventive cells juxtaposed to one another. Likewise, as illustrated in FIG. 5, the fixed electrodes may be made of materials other than brass. As shown in FIG. 5, the fixed electrodes are made of a non-conductive plastic having a layer of conductive material 64 disposed thereon underneath the insulative layer of paint 66. In the embodiment illustrated in FIG. 5, electrode 16 is replaced by plastic electrode 16' and electrodes 12 and 14 and replaced by plastic electrode 14'. Likewise, metal electrode 18 is replaced by plastic electrode 18'. In this embodiment the metalized layer 64 on the plastic electrodes 14', 16' and 18' does not extend below the visible portions of the faces of the electrodes. Accordingly, it is not necessary to have a thin shim 20 or 26 with these embodiments as the base of electrodes 16' and 18' are made of insulative material and perform the same function. Likewise, in the embodiment shown in FIG. 5 electrode 14' is insulative at its base and, accordingly, does not require the use of an insulator strip 34.

I claim:

1. An electrostatically driven electromechanical display device, comprising:

(a) first electrode means having a reflective face of first reflectivity;
(b) second electrode means having a reflective face of second reflectivity, said second reflectivity being different from said first reflectivity;
(c) a flexible conductive tongue disposed between said first and second electrode means;
(d) first support means for supporting said first electrode means with its face in facing spaced relationship to the face of said second electrode means; and
(e) second support means for supporting said tongue between said facing portions of said first electrode means and second electrode means in a position from which said tongue may be caused to bear against the face of said first electrode means or the face of said second electrode means and in which said tongue is in contact with the base portions of the reflective faces of said first electrode means and said second electrode means.

2. A device as in claim 1, wherein said second support means comprises thin and thick support means which are positioned between said first and second electrode means and support said tongue between them.

3. A device as in claim 1 or 2, wherein one of said electrode means is connected to ground and the other of said electrode means is connected to a first alternating current signal and wherein the tongue is selectively connected to ground or to a second alternating current signal which is of substantially equal magnitude and of opposite sign with respect to said first alternating current signal.

4. A device as in claim 1, wherein said device further comprises a second device identical to said first device and positioned as a mirror image thereof and wherein said tongue in said first device and said tongue in said second device are integral, being formed from a single sheet of flexible reflective material.

5. A device as in claim 1, wherein the space between the face of said first electrode means and the face of said second electrode means is maintained by spacer means disposed between said first and second electrode means.

6. A device as in claim 5, wherein said spacer means comprises raised portions on said first and/or second electrode means.

7. A device as in claim 1 or 6 wherein said tongue bears resiliently against said first electrode means and said second electrode means.

8. A display device as in claim 1, wherein said first and second electrode means comprise sheet metal.

9. A display device as in claim 1, wherein said first and second electrode means comprise plastic members with a conductive layer disposed on the upper portions thereof.

10. A display device as in claim 1 or 6, wherein said faces of first and second reflectivity comprises layers of insulative paint.

11. An electrostatically driven electromechanical display device, comprising:

(a) first electrode means having a reflective face of first reflectivity;
(b) second electrode means having a reflective face of second reflectivity, said second reflectivity being different from said first reflectivity;
(c) a flexible conductive tongue disposed between said first and second electrode means;
(d) first support means for supporting said first electrode means with its face in facing relationship to the face of said second electrode means; and
(e) alternating current means for selectively applying a.c. potential differences to said first and second electrode means and said tongue to selectively cause electrostatic forces to appear between said tongue and said first electrode means or between said tongue and said second electrode means.

12. A device as in claim 11, wherein said alternating current means supplies a signal which is substantially a square wave.

* * * * *